Patented Feb. 21, 1933

1,898,992

UNITED STATES PATENT OFFICE

MIRIAM I. GUEST, OF CHICAGO, ILLINOIS; WARD E. GUEST, ADMINISTRATOR OF SAID MIRIAM I. GUEST, DECEASED, ASSIGNOR TO W. BARTLETT JONES, AS TRUSTEE, OF CHICAGO, ILLINOIS

CHEESE AND MANUFACTURE OF HOLES THEREIN

No Drawing.  Application filed August 27, 1929.  Serial No. 388,855.

The present invention relates to cheese, and more particularly to the formation of holes in cheese.

In certain cheeses, Swiss cheese being the outstanding example, holes are formed by the collection of gas formed by some cheese-forming bacteria. In Swiss cheese the holes are called "eyes" and they are a characteristic feature of Swiss cheese by which it is commonly recognized. Without the holes or eyes a real Swiss cheese is likely to be rejected as being non-genuine or is given a lower grade and value. It is therefore very important from a standpoint of merchandising certain reformed cheeses that holes be made therein, when the original cheese in its natural condition is characterized by holes.

Reformed cheeses are commonly procurable on the market. For example, certain large dairy companies secure cheeses from many small sources, such as cheese factories, in various localities, each factory having a more or less distinctive type of flavor for its cheese. The problems of the large distributor is to provide the public with a uniform product. Consequently the practice of blending the various lots of cheese into a uniform large lot has grown up, and is accompanied by a process of pasteurization. The process may comprise skinning the individual cheeses, disintegrating them, as by shredding, mixing the shredded cheese in a kettle at a pasteurizing heat, whereby the cheese becomes plastic or melts down into a uniform batch of pasteurized blended cheese. The melted or plastic cheese is formed into a package, which may be differently shaped from the original cheese. The process enables the collecting dairy company to provide to the public in various sized small packages many types of cheese of uniform size, shape, quality, color, flavor, etc., as the public now demands.

Such a process as above described is quite essential to modern business methods and demands and is now practiced to a large extent. It has its drawbacks, however, for the buying public does not appreciate the process, and is prejudiced by older customs. For example, the processed Swiss cheese, when reformed, has lost its natural and characteristic "eyes", and the public does not believe that the processed cheese is the genuine Swiss cheese, merely for the lack of holes.

One object of the present invention is to form holes in cheese to simulate the natural holes.

A particular object of the invention is to introduce into the cheese a gas which is inert to the cheese to form bubbles, eyes or holes.

A further object of the invention is the introduction of carbon dioxide to form the holes in Swiss cheese.

A still further object of the invention is the introduction of gas by embodying in the plastic cheese a concentrated form of gas, such as solid carbon dioxide, which is thereafter released to form the desired hole.

Although the present invention is not limited to the manufacture of Swiss cheese, it has its greatest application to that variety, and will be herein more specifically described with reference to the Swiss cheese.

Speaking generally of cheese formation, it is well known that the raw material, such as the curds of milk, may be the same for widely different cheeses. The kinds of bacteria which are allowed to act upon the raw material and the conditions provided for such action are the determinants for the cheese which results. Some of the bacteria form gas which collects in the cheese. This is particularly true of *Bacterium acidi-propionici* which is a prominent bacterium in forming Swiss cheese. The gas forms into "eyes" in the cheese and is largely carbon dioxide, but contains some nitrogen and hydrogen. The carbon dioxide gas is not generally an inert gas, but as to the cheese in which it is formed naturally is considered as inert, or of no harmful action. Hereinafter, when a gas is mentioned as being inert, it is to be understood that the word has reference to its action on the cheese to which it is referred. As distinguished from carbon dioxide, air because of its oxygen, is not considered as being inert to Swiss cheese, for the oxygen causes discoloration of the cheese and rancidity of oils or fats in the cheese. Carbon dioxide has an added advantage in that it is ordinarily toxic to the bacterial life that produces it, and a presence of carbon dioxide in the reformed and sterilized or pasteurized cheese tends to inhibit growth of any bacterial life of that kind that has not been completely killed or that may have been afterwards acquired.

In carrying out the invention, the plastic cheese, such as the heated and pasteurized blended cheeses, is extruded, poured, formed or moulded into a marketable shape. While the cheese is in the plastic stage in the process of packaging, I may introduce gas or gas-forming substance into the cheese, so proportioning, distributing and locating the addition agent that the resulting holes as they appear in the cut cheese simulate the natural holes in a natural cheese. It is to be understood that these conditions will vary with the kind of cheese being treated, or imitated, and therefore no fixed rules in regard thereto can be given.

I may introduce air, but in Swiss cheese I would not for the reason that the resulting discoloration would affect the marketability of the cheese. In Swiss cheese I prefer to introduce carbon dioxide, for this is the predominant gas of natural eyes of Swiss cheese. I also prefer to use carbon dioxide for the reason that it may be readily introduced by methods about to be described.

Carbon dioxide, being a rather soluble gas, has its solubility greatly increased by lowering the temperature and/or increasing the pressure of a solution of carbon dioxide. This is familiar to all by their experience with carbonated beverages. Upon release of pressure and/or increase of temperature the gas is released. In one method of applying carbon dioxide to Swiss cheese, I may prepare previously to application of the gas, a number of small masses of Swiss cheese which are highly saturated with carbon dioxide under abnormal conditions of increased pressure and/or lowered temperature. When the softened cheese flows or is placed into the form of the eventual cheese package, or into a form that is in permanent condition for the sale of the product, these lumps are distributed throughout the mass. The increased temperature of the cheese liberates the carbon dioxide which forms a bubble, hole or eye in the cooling product.

Another method which I may use is even more advantageous and is preferred to the first method. Carbon dioxide is now available in solid powdered or crystal form known as dry ice. It is used as a refrigerant and evolves only carbon dioxide, having no water, solid or other matter associated with it. Into the softened cheese, I may distribute particles or crystals of dry ice, embodying them quickly into the mass, so that the gas that is evolved is trapped to form an eye, hole or bubble. The gas formation is attended by cooling so that in the vicinity of the dry ice crystal the cheese becomes chilled, insuring the complete trapping of the gas. When the crystal is completely gasified the bubble boundary will then become more softened by heat from the surrounding cheese. The bubble may yield to stresses in the cheese due to the cooling of the cheese generally, and due to its unequal temperatures locally because of the dry ice addition. Such yielding will form irregular shaped holes which characterize natural Swiss cheese.

Still another method that may be employed is the addition of other forms of gas, solidified or liquefied. For example a spray of liquid nitrogen may be embodied in the plastic cheese, so that upon release in the cheese there are formed bubbles of nitrogen.

From the foregoing, it will appear that the present invention is not limited to Swiss cheese, nor to carbon dioxide, although the given examples represent the best known use of the invention. Various other uses and modifications of the invention are contemplated in defining this invention by the appended claims.

I claim:

1. The method of forming holes or "eyes" in reformed cheese which comprises softening the cheese to a plastic stage, and introducing into the plastic cheese a non-gaseous particle containing inert gas in latent form capable of being released into gaseous form when embodied in the plastic cheese.

2. The method of forming holes or "eyes" in reformed cheese which comprises softening cheese to a plastic stage, and introducing into the plastic cheese a non-gaseous particle containing carbon dioxide in concentrated form, said carbon dioxide being capable of release into gaseous form under conditions prevailing in the plastic cheese.

3. The method of forming holes or "eyes" in reformed cheese which comprises softening the cheese to a plastic stage, and introducing into the plastic cheese particles of solid carbon dioxide.

4. The method of forming holes or "eyes" in reformed cheese which comprises softening the cheese to a plastic stage, and introducing into the plastic cheese non-gaseous particles comprising condensed gas capable of release into gaseous form upon embodiment in the cheese.

In testimony whereof I have hereunto affixed my signature.

MIRIAM I. GUEST.